United States Patent
Steimberg et al.

(10) Patent No.: US 11,509,680 B2
(45) Date of Patent: Nov. 22, 2022

(54) CLASSIFICATION OF CYBER-ALERTS INTO SECURITY INCIDENTS

(71) Applicant: PALO ALTO NETWORKS (ISRAEL ANALYTICS) LTD., Tel Aviv (IL)

(72) Inventors: Gal Steimberg, Tel Aviv (IL); Dan Cohen, Rishon Lezion (IL); Itay Katz, Kfar Sava (IL); Matan Weigert, Tel Aviv (IL)

(73) Assignee: PALO ALTO NETWORKS (ISRAEL ANALYTICS) LTD., Tel Aviv (IL)

( * ) Notice: Subject to any disclaimer, the term of this patent is extended or adjusted under 35 U.S.C. 154(b) by 111 days.

(21) Appl. No.: 17/038,285

(22) Filed: Sep. 30, 2020

(65) Prior Publication Data
US 2022/0103590 A1 Mar. 31, 2022

(51) Int. Cl.
*H04L 9/40* (2022.01)

(52) U.S. Cl.
CPC .......... *H04L 63/1433* (2013.01); *H04L 63/02* (2013.01); *H04L 63/104* (2013.01); *H04L 63/1425* (2013.01)

(58) Field of Classification Search
CPC ... H04L 63/1433; H04L 63/02; H04L 63/104; H04L 63/1425
See application file for complete search history.

(56) References Cited

U.S. PATENT DOCUMENTS

| | | | |
|---|---|---|---|
| 5,991,881 A | 11/1999 | Conklin et al. | |
| 6,347,374 B1 | 2/2002 | Drake et al. | |
| 6,704,874 B1 * | 3/2004 | Porras | H04L 63/1458 709/224 |
| 7,007,301 B2 * | 2/2006 | Crosbie | G06F 21/552 709/224 |
| 7,178,164 B1 | 2/2007 | Bonnes | |
| 7,181,769 B1 | 2/2007 | Keanini et al. | |

(Continued)

FOREIGN PATENT DOCUMENTS

| | | |
|---|---|---|
| EP | 0952521 A2 | 10/1999 |
| EP | 2056559 A1 | 5/2009 |
| WO | 03083660 A1 | 10/2003 |

OTHER PUBLICATIONS

Xu, Dingbang, and Peng Ning. Correlation analysis of intrusion alerts. North Carolina State University, 2006. (Year: 2006).*

(Continued)

*Primary Examiner* — Jung W Kim
*Assistant Examiner* — Sameera Wickramasuriya
(74) *Attorney, Agent, or Firm* — Kligler & Associates Patent Attorneys Ltd

(57) ABSTRACT

Methods, apparatuses and computer program products that implement embodiments of the present invention for protecting a computer network, include receiving, in a security server, alerts of multiple different types, indicative of potentially malicious activity in the network, that are detected by multiple different protection appliances deployed in the network. The alerts in the security server are correlated so as to identify a first alert of a first type from a first protection appliance in the network and a second alert of a second type, different from the first type from a second protection appliance in the network that are together indicative of a single attack on the network. Finally, a consolidated alert is issued responsively to the attack.

17 Claims, 5 Drawing Sheets

(56) References Cited

U.S. PATENT DOCUMENTS

| | | | |
|---|---|---|---|
| 7,523,016 B1 | 4/2009 | Surdulescu et al. | |
| 7,694,150 B1 | 4/2010 | Kirby | |
| 7,703,138 B2 | 4/2010 | Desai et al. | |
| 7,712,134 B1 | 5/2010 | Nucci et al. | |
| 7,752,665 B1 | 7/2010 | Robertson et al. | |
| 7,908,655 B1 | 3/2011 | Bhattacharyya et al. | |
| 8,245,298 B2 | 8/2012 | Pletka et al. | |
| 8,397,284 B2 | 3/2013 | Kommareddy et al. | |
| 8,429,180 B1 | 4/2013 | Sobel et al. | |
| 8,490,190 B1 | 7/2013 | Hernacki et al. | |
| 8,516,573 B1 | 8/2013 | Brown et al. | |
| 8,555,388 B1 | 10/2013 | Wang et al. | |
| 8,578,345 B1 * | 11/2013 | Kennedy | G06F 21/566 717/174 |
| 8,607,353 B2 | 12/2013 | Rippert, Jr. et al. | |
| 8,620,942 B1 | 12/2013 | Hoffman et al. | |
| 8,677,487 B2 | 3/2014 | Balupari et al. | |
| 8,762,288 B2 | 6/2014 | Dill | |
| 8,769,681 B1 | 7/2014 | Michels et al. | |
| 8,925,095 B2 | 12/2014 | Herz et al. | |
| 8,966,625 B1 | 2/2015 | Zuk et al. | |
| 9,038,178 B1 | 5/2015 | Lin | |
| 9,118,582 B1 | 8/2015 | Martini | |
| 9,147,071 B2 | 9/2015 | Sallam | |
| 9,231,962 B1 | 1/2016 | Yen et al. | |
| 9,342,691 B2 | 5/2016 | Maestas | |
| 9,378,361 B1 | 6/2016 | Yen et al. | |
| 9,386,028 B2 | 7/2016 | Altman | |
| 9,531,614 B1 | 12/2016 | Nataraj et al. | |
| 9,531,736 B1 * | 12/2016 | Torres | H04L 63/1416 |
| 9,736,251 B1 | 8/2017 | Samant et al. | |
| 9,773,112 B1 * | 9/2017 | Rathor | G06F 21/554 |
| 9,979,739 B2 | 5/2018 | Mumcuoglu et al. | |
| 9,979,742 B2 | 5/2018 | Mumcuoglu et al. | |
| 10,027,694 B1 | 7/2018 | Gupta et al. | |
| 10,075,461 B2 | 9/2018 | Mumcuoglu et al. | |
| 10,140,453 B1 | 11/2018 | Fridakis | |
| 10,237,875 B1 | 3/2019 | Romanov | |
| 10,706,144 B1 * | 7/2020 | Moritz | G06F 21/55 |
| 10,728,281 B2 | 7/2020 | Kurakami | |
| 10,904,277 B1 | 1/2021 | Sharifi Mehr | |
| 2002/0059078 A1 | 5/2002 | Valdes et al. | |
| 2002/0133586 A1 | 9/2002 | Shanklin et al. | |
| 2003/0110396 A1 | 6/2003 | Lewis et al. | |
| 2003/0133443 A1 | 7/2003 | Klinker et al. | |
| 2004/0003286 A1 | 1/2004 | Kaler et al. | |
| 2004/0015728 A1 | 1/2004 | Cole et al. | |
| 2004/0117658 A1 | 6/2004 | Klaes | |
| 2004/0199793 A1 | 10/2004 | Wilken et al. | |
| 2004/0210769 A1 | 10/2004 | Radatti et al. | |
| 2004/0250169 A1 | 12/2004 | Takemori et al. | |
| 2004/0260733 A1 | 12/2004 | Adelstein et al. | |
| 2005/0015624 A1 * | 1/2005 | Ginter | H04L 63/145 726/4 |
| 2005/0060295 A1 | 3/2005 | Gould et al. | |
| 2005/0071330 A1 * | 3/2005 | Douceur | G06F 16/1748 |
| 2005/0128989 A1 | 6/2005 | Bhagwat et al. | |
| 2005/0216749 A1 | 9/2005 | Brent | |
| 2005/0262560 A1 | 11/2005 | Gassoway | |
| 2005/0268112 A1 | 12/2005 | Wang et al. | |
| 2005/0286423 A1 | 12/2005 | Poletto et al. | |
| 2006/0018466 A1 | 1/2006 | Adelstein et al. | |
| 2006/0075462 A1 | 4/2006 | Golan | |
| 2006/0075492 A1 | 4/2006 | Golan et al. | |
| 2006/0075500 A1 | 4/2006 | Bertman et al. | |
| 2006/0107321 A1 | 5/2006 | Tzadikario | |
| 2006/0126522 A1 | 6/2006 | Oh | |
| 2006/0136720 A1 | 6/2006 | Armstrong et al. | |
| 2006/0137009 A1 | 6/2006 | Chesla | |
| 2006/0149848 A1 | 7/2006 | Shay | |
| 2006/0156398 A1 | 7/2006 | Ross et al. | |
| 2006/0161984 A1 | 7/2006 | Phillips et al. | |
| 2006/0191010 A1 | 8/2006 | Benjamin | |
| 2006/0215627 A1 | 9/2006 | Waxman | |
| 2006/0242694 A1 | 10/2006 | Gold et al. | |
| 2006/0259967 A1 | 11/2006 | Thomas et al. | |
| 2006/0282893 A1 | 12/2006 | Wu et al. | |
| 2007/0011319 A1 | 1/2007 | McClure et al. | |
| 2007/0072661 A1 | 3/2007 | Lototski | |
| 2007/0198603 A1 | 8/2007 | Tsioutsiouliklis et al. | |
| 2007/0218874 A1 | 9/2007 | Sinha et al. | |
| 2007/0226796 A1 | 9/2007 | Gilbert et al. | |
| 2007/0226802 A1 | 9/2007 | Gopalan et al. | |
| 2007/0245420 A1 | 10/2007 | Yong et al. | |
| 2007/0255724 A1 | 11/2007 | Jung et al. | |
| 2007/0283166 A1 | 12/2007 | Yami et al. | |
| 2008/0005782 A1 | 1/2008 | Aziz | |
| 2008/0016339 A1 | 1/2008 | Shukla | |
| 2008/0016570 A1 | 1/2008 | Capalik | |
| 2008/0104046 A1 | 5/2008 | Singla et al. | |
| 2008/0104703 A1 | 5/2008 | Rihn et al. | |
| 2008/0134296 A1 | 6/2008 | Amitai et al. | |
| 2008/0148381 A1 | 6/2008 | Aaron | |
| 2008/0198005 A1 | 8/2008 | Schulak | |
| 2008/0262991 A1 | 10/2008 | Kapoor et al. | |
| 2008/0271143 A1 | 10/2008 | Stephens et al. | |
| 2008/0285464 A1 | 11/2008 | Katzir | |
| 2009/0007100 A1 | 1/2009 | Field et al. | |
| 2009/0007220 A1 | 1/2009 | Ormazabal et al. | |
| 2009/0115570 A1 | 5/2009 | Cusack, Jr. | |
| 2009/0157574 A1 | 6/2009 | Lee | |
| 2009/0164522 A1 | 6/2009 | Fahey | |
| 2009/0193103 A1 | 7/2009 | Small et al. | |
| 2009/0265777 A1 | 10/2009 | Scott | |
| 2009/0320136 A1 | 12/2009 | Lambert et al. | |
| 2010/0054241 A1 | 3/2010 | Shah et al. | |
| 2010/0071063 A1 | 3/2010 | Wang et al. | |
| 2010/0107257 A1 | 4/2010 | Ollmann | |
| 2010/0162400 A1 | 6/2010 | Feeney et al. | |
| 2010/0197318 A1 | 8/2010 | Petersen et al. | |
| 2010/0212013 A1 | 8/2010 | Kim et al. | |
| 2010/0217861 A1 | 8/2010 | Wu | |
| 2010/0235915 A1 | 9/2010 | Memon et al. | |
| 2010/0268818 A1 | 10/2010 | Richmond et al. | |
| 2010/0278054 A1 | 11/2010 | Dighe | |
| 2010/0280978 A1 | 11/2010 | Shimada et al. | |
| 2010/0284282 A1 | 11/2010 | Golic | |
| 2010/0299430 A1 | 11/2010 | Powers et al. | |
| 2011/0026521 A1 | 2/2011 | Gamage et al. | |
| 2011/0035795 A1 | 2/2011 | Shi | |
| 2011/0087779 A1 | 4/2011 | Martin et al. | |
| 2011/0125770 A1 | 5/2011 | Battestini et al. | |
| 2011/0153748 A1 | 6/2011 | Lee et al. | |
| 2011/0185055 A1 | 7/2011 | Nappier et al. | |
| 2011/0185421 A1 | 7/2011 | Wittenstein et al. | |
| 2011/0214187 A1 | 9/2011 | Wittenstein et al. | |
| 2011/0247071 A1 | 10/2011 | Hooks et al. | |
| 2011/0265011 A1 | 10/2011 | Taylor et al. | |
| 2011/0270957 A1 | 11/2011 | Phan et al. | |
| 2011/0271343 A1 * | 11/2011 | Kim | G06F 21/566 726/23 |
| 2011/0302653 A1 | 12/2011 | Frantz et al. | |
| 2012/0042060 A1 | 2/2012 | Jackowski et al. | |
| 2012/0079596 A1 | 3/2012 | Thomas et al. | |
| 2012/0102359 A1 | 4/2012 | Hooks | |
| 2012/0136802 A1 | 5/2012 | McQuade et al. | |
| 2012/0137342 A1 | 5/2012 | Hartrell et al. | |
| 2012/0143650 A1 | 6/2012 | Crowley et al. | |
| 2012/0191660 A1 | 7/2012 | Hoog | |
| 2012/0222120 A1 | 8/2012 | Rim et al. | |
| 2012/0233311 A1 | 9/2012 | Parker et al. | |
| 2012/0240185 A1 | 9/2012 | Kapoor et al. | |
| 2012/0275505 A1 | 11/2012 | Tzannes et al. | |
| 2012/0331553 A1 | 12/2012 | Aziz et al. | |
| 2013/0031600 A1 | 1/2013 | Luna et al. | |
| 2013/0083700 A1 | 4/2013 | Sndhu et al. | |
| 2013/0097706 A1 | 4/2013 | Titonis et al. | |
| 2013/0111211 A1 | 5/2013 | Winslow et al. | |
| 2013/0031037 A1 | 7/2013 | Brandt et al. | |
| 2013/0196549 A1 | 8/2013 | Sorani | |
| 2013/0298237 A1 | 11/2013 | Smith | |
| 2013/0298243 A1 | 11/2013 | Kumar et al. | |
| 2013/0333041 A1 | 12/2013 | Christodorescu et al. | |
| 2014/0013434 A1 | 1/2014 | Ranum et al. | |

(56) References Cited

U.S. PATENT DOCUMENTS

| | | |
|---|---|---|
| 2014/0165207 A1 | 6/2014 | Engel et al. |
| 2014/0198669 A1 | 7/2014 | Brown et al. |
| 2014/0230059 A1 | 8/2014 | Wang |
| 2014/0325643 A1 | 10/2014 | Bart et al. |
| 2015/0040219 A1 | 2/2015 | Garraway et al. |
| 2015/0047032 A1 | 2/2015 | Hannis et al. |
| 2015/0071308 A1 | 3/2015 | Webb, III et al. |
| 2015/0121461 A1 | 4/2015 | Dulkin et al. |
| 2015/0180883 A1* | 6/2015 | Aktas .................... G06F 21/564 726/23 |
| 2015/0195300 A1 | 7/2015 | Adjaoute |
| 2015/0264069 A1 | 9/2015 | Beauchesne et al. |
| 2015/0304346 A1 | 10/2015 | Kim |
| 2015/0341380 A1 | 11/2015 | Heo et al. |
| 2015/0341389 A1 | 11/2015 | Kurakami |
| 2016/0021141 A1 | 1/2016 | Liu et al. |
| 2016/0127390 A1 | 5/2016 | Lai et al. |
| 2016/0191918 A1 | 6/2016 | Lai et al. |
| 2016/0234167 A1 | 8/2016 | Engel et al. |
| 2016/0247163 A1 | 8/2016 | Donsky et al. |
| 2016/0315954 A1 | 10/2016 | Peterson et al. |
| 2016/0323299 A1 | 11/2016 | Huston, III |
| 2016/0359895 A1* | 12/2016 | Chiu ....................... H04L 63/20 |
| 2017/0026387 A1 | 1/2017 | Vissamsetty et al. |
| 2017/0026395 A1 | 1/2017 | Mumcuoglu et al. |
| 2017/0054744 A1 | 2/2017 | Mumcuoglu et al. |
| 2017/0063921 A1 | 3/2017 | Fridman et al. |
| 2017/0078312 A1 | 3/2017 | Yamada et al. |
| 2017/0111376 A1 | 4/2017 | Friedlander et al. |
| 2017/0171229 A1* | 6/2017 | Arzi .................... H04L 63/1425 |
| 2017/0262633 A1 | 9/2017 | Miserendino et al. |
| 2017/0294112 A1* | 10/2017 | Kushnir ................ G08B 29/02 |
| 2018/0004948 A1 | 1/2018 | Martin et al. |
| 2018/0048662 A1* | 2/2018 | Jang ................... H04L 63/1416 |
| 2018/0332064 A1 | 11/2018 | Harris et al. |
| 2019/0044963 A1 | 2/2019 | Rajasekharan et al. |
| 2019/0297097 A1* | 9/2019 | Gong .................... G06F 21/566 |
| 2019/0319981 A1 | 10/2019 | Meshi et al. |
| 2019/0334931 A1 | 10/2019 | Arlitt et al. |
| 2020/0007566 A1 | 1/2020 | Wu |
| 2020/0145435 A1 | 5/2020 | Chiu et al. |
| 2020/0195673 A1 | 6/2020 | Lee |
| 2020/0244658 A1 | 7/2020 | Meshi et al. |
| 2020/0244675 A1 | 7/2020 | Meshi et al. |
| 2020/0244676 A1 | 7/2020 | Amit et al. |
| 2020/0244683 A1 | 7/2020 | Meshi et al. |
| 2020/0244684 A1 | 7/2020 | Meshi et al. |
| 2020/0293917 A1* | 9/2020 | Wang .................... G06N 5/022 |
| 2020/0374301 A1* | 11/2020 | Manevich ........... G06F 16/2255 |
| 2021/0004458 A1* | 1/2021 | Edwards ............... G06F 21/554 |

OTHER PUBLICATIONS

Zhang, Shaojun, et al. "Building network attack graph for alert causal correlation." Computers & security 27.5-6 (2008): 188-196. (Year: 2008).*

Niksun, "Network Intrusion Forensic System (NIFS) for Intrusion Detection and Advanced Post Incident Forensics", Whitepaper, pp. 1-12, Feb. 15, 2010.

Shulman, A., "Top Ten Database Security Threats How to Mitigate the Most Significant Database Vulnerabilities", White Paper, pp. 1-14, year 2006.

Asrigo et al., "Using VMM-based sensors to monitor honeypots," Proceedings of the 2nd International Conference on Virtual Execution Environments, pp. 13-23, Jun. 14, 2006.

Bhuyan et al., "Surveying Port Scans and Their Detection Methodologies", Computer Journal, vol. 54, No. 10, pp. 1565-1581, Apr. 20, 2011.

Skormin, "Anomaly-Based Intrusion Detection Systems Utilizing System Call Data", Watson School of Engineering at Binghamton University, pp. 1-82, Mar. 1, 2012.

Palo Alto Networks, "Cortex XDR", datasheet, pp. 1-7, year 2020.

Palo Alto Networks, "WildFire", datasheet, pp. 1-6, year 2020.

Barford et al., "Characteristics of Network Traffic Flow Anomalies," Proceedings of the 1st ACM SIGCOMM Workshop on Internet Measurement, pp. 69-73, year 2001.

U.S. Appl. No. 16/261,606 Office Action dated Feb. 5, 2021.

U.S. Appl. No. 16/261,608 Office Action dated Feb. 5, 2021.

U.S. Appl. No. 16/261,655 Office Action dated Jan. 29, 2021.

U.S. Appl. No. 16/261,634 Office Action dated Mar. 8, 2021.

Light Cyber Ltd, "LightCyber Magna", pp. 1-3, year 2011.

Tier-3 Pty Ltd, "Huntsman Protector 360", Brochure, pp. 1-2, Apr. 1, 2010.

Tier-3 Pty Ltd, "Huntsman 5.7 The Power of 2", Brochure, pp. 1-2, Oct. 8, 2012.

Bilge et at., "Disclosure: Detecting Botnet Command and Control Servers Through Large-Scale NetFlow Analysis", ACSAC, pp. 1-10, Dec. 3-7, 2012.

Blum., "Combining Labeled and Unlabeled Data with Co-Training", Carnegie Mellon University, Research Showcase @ CMU, Computer Science Department, pp. 1-11, Jul. 1998.

Felegyhazi et al., "On the Potential of Proactive Domain Blacklisting", LEET'10 Proceedings of the 3rd USENIX Conference on Large-scale exploits and emergent threats, pp. 1-8, San Jose, USA, Apr. 27, 2010.

Frosch., "Mining DNS-related Data for Suspicious Features", Ruhr Universitat Bochum, Master'sThesis, pp. 1-88, Dec. 23, 2011.

Bilge at al., "Exposure: Finding Malicious Domains Using Passive DNS Analysis", NDSS Symposium, pp. 1-17, Feb. 6-9, 2011.

Gross et al., "Fire: Finding Rogue Networks", Annual Conference on Computer Security Applications (ACSAC'09), pp. 1-10, Dec. 7-11, 2009.

Markowitz, N., "Bullet Proof Hosting: A Theoretical Model", Security Week, [pp. 1-5, Jun. 29, 2010, downloaded from http://www.infosecisland.com/blogview/4487-Bullet-Proof-Hosting-A-Theoretical-Model.html.

Konte et al., "ASwatch: An AS Reputation System to Expose Bulletproof Hosting ASes", SIGCOMM , pp. 625-638, Aug. 17-21, 2015.

Markowitz, N., "Patterns of Use and Abuse with IP Addresses", Security Week, pp. 1-4, Jul. 10, 2010, downloaded from http://infosecisland.com/blogview/5068-Patterns-of-Use-and-Abuse-with-IP-Addresses.html.

Wei et al., "Identifying New Spam Domains by Hosting IPs: Improving Domain Blacklisting", Department of Computer and Information Sciences, University of Alabama at Birmingham, USA, pp. 1-8, Dec. 8, 2010.

Goncharov,M., "Criminal Hideouts for Lease: Bulletproof Hosting Services", Forward-Looking Threat Research (FTR) Team, A TrendLabsSM Research Paper, pp. 1-28, Jul. 3, 2015.

U.S. Appl. No. 16/261,634 Office Action dated Sep. 8, 2021.

"PA-3250 Next Generation Firewall," PS-3200 Series, Datasheet, Palo Alto Networks, Inc., Santa Clara, CA, USA, pp. 1-4, year 2021.

"What is PCI DSS?" Palo Alto Networks, Cyberpedia, pp. 1-5, year 2021, as downloaded from https://www.paloaltonetworks.com/cyberpedia/what-is-a-pci-dss.

Wikipedia, "Active Directory," pp. 1-14, last edited Oct. 2021.

International Application # PCT/IB2021/058621 Search Report dated Dec. 14, 2021.

* cited by examiner

CLASSIFICATION OF CYBER-ALERTS INTO SECURITY INCIDENTS

FIELD OF THE INVENTION

The present invention relates generally to computer security and networks, and particularly to classifying cyber-alerts into security incidents that triggered the alerts.

BACKGROUND OF THE INVENTION

In many computers and network systems, multiple layers of security apparatus and software are deployed in order to detect and repel the ever-growing range of security threats. At the most basic level, computers use anti-virus software to prevent malicious software from running on the computer. At the network level, intrusion detection and prevention systems analyze and control network traffic to detect and prevent malware from spreading through the network.

The description above is presented as a general overview of related art in this field and should not be construed as an admission that any of the information it contains constitutes prior art against the present patent application.

SUMMARY OF THE INVENTION

There is provided, in accordance with an embodiment of the present invention a method for protecting a computer network, including receiving, in a security server, alerts of multiple different types, indicative of potentially malicious activity in the network, that are detected by multiple different protection appliances deployed in the network, correlating the alerts in the security server so as to identify a first alert of a first type from a first protection appliance in the network and a second alert of a second type, different from the first type from a second protection appliance in the network that are together indicative of a single attack on the network, and issuing a consolidated alert responsively to the attack.

In one embodiment, receiving the first alert includes receiving the first alert at a first time, and wherein receiving the second alert includes receiving the second alert at a second time subsequent to the first time, wherein the first and the second times are within a specified time period.

In another embodiment, the network includes multiple computing devices executing respective pluralities of processes.

In an additional embodiment, the method also includes identifying respective causality group owners (CGOs) for each of the processes, and wherein correlating the alerts includes detecting that the CGO for the first given process matches the CGO for the second given process.

In a further embodiment, the method also includes identifying respective execution chains for each of the processes, wherein each of the processes includes an endpoint for its respective execution chain, and wherein correlating the alerts includes detecting that the execution chain for the first given process matches the execution chain for the second given process.

In a supplemental embodiment, the method also includes computing respective parent hashes for the processes, wherein each given alert includes a given process and its respective parent hash, and wherein correlating the alerts includes detecting that the parent hash for the first alert matches the parent hash for the second alert.

In one embodiment, correlating the alerts includes detecting that the first alert indicates a first given computing device conveying a first transmission to an Internet site suspected of being malicious, and detecting that the second alert indicates a second given computing device conveying a second transmission to the Internet site.

In another embodiment, correlating the alerts includes detecting that the first alert indicates a first given computing device storing a file suspected of being malicious, and detecting that the second alert indicates a second computing device storing an identical copy of the file.

In an additional embodiment, each given protection appliance is selected from a group consisting of a firewall, a software application executing on a given computing device, a data cloud firewall and a data cloud security software application.

There is also provided, in accordance with an embodiment of the present invention an apparatus for protecting a computer network, including a network interface card (NIC), and at least one processor configured to receive alerts of multiple different types, indicative of potentially malicious activity in the network, that are detected by multiple different protection appliances deployed in the network, to correlate the alerts so as to identify a first alert of a first type from a first protection appliance in the network and a second alert of a second type, different from the first type from a second protection appliance in the network that are together indicative of a single attack on the network, and to issue a consolidated alert responsively to the attack.

There is additionally provided, in accordance with an embodiment of the present invention a computer software product for protecting a computing system, the product including a non-transitory computer-readable medium, in which program instructions are stored, which instructions, when read by a computer, cause the computer to receive alerts of multiple different types, indicative of potentially malicious activity in the network, that are detected by multiple different protection appliances deployed in the network, to correlate the alerts so as to identify a first alert of a first type from a first protection appliance in the network and a second alert of a second type, different from the first type from a second protection appliance in the network that are together indicative of a single attack on the network, and to issue a consolidated alert responsively to the attack.

BRIEF DESCRIPTION OF THE DRAWINGS

The disclosure is herein described, by way of example only, with reference to the accompanying drawings, wherein.

DETAILED DESCRIPTION OF EMBODIMENTS

Security analysts for enterprise networks can receive a large number of cyber-alerts (also referred to herein simply as alerts) received from a plurality of sources. In response to receiving the alerts, security analysts are responsible to triage, investigate and respond to each and every one of these alerts. Although these alerts correspond to a security incident in the network, each security incident typically generates multiple alerts of different types from different sources.

Given the number of alerts and the number of different sources for the alerts, it is virtually impossible to for one person (or even a group of people) to classify the alerts into individual security incidents. For example, large computing facilities may "see" in excess of 100,000 different cyber-alerts over a short time period (e.g., one week), since there may be a large number (e.g., 400) of endpoints that can be infected by a single cyber-attack.

Embodiments of the present invention provide methods and systems for protecting a computer network by classifying multiple cyber-alerts into a manageable set of security incidents that security analysts can investigate and resolve. As described hereinbelow, a security server receives alerts of multiple different types. In embodiments described herein, the alerts are (a) indicative of potentially malicious activity in the network, and (b) detected by multiple different protection appliances deployed in the network. Examples of protection appliances include, but are not limited to, firewalls and cyber security software executing on network endpoints such as computing devices.

The security server can then correlate the alerts so as to identify a first alert of a first type from a first protection appliance in the network and a second alert of a second type, different from the first type from a second protection appliance in the network that are together indicative of a single attack on the network. Upon correlating the alerts, the security server can issue a consolidated alert responsively to the attack.

As described hereinbelow, the security server extracts cyber-artifacts (e.g., file and process hashes, and source and destination IP addresses) from the alerts, and classifies the alerts based on the extracted artifacts. By classifying multiple alerts into a single security incident, systems implementing embodiments of the present invention can enable security analysts to respond more efficiently to cyber-attacks (i.e., by responding to the security incidents, as opposed to investigating each of the alerts).

System Description

Figure 1:
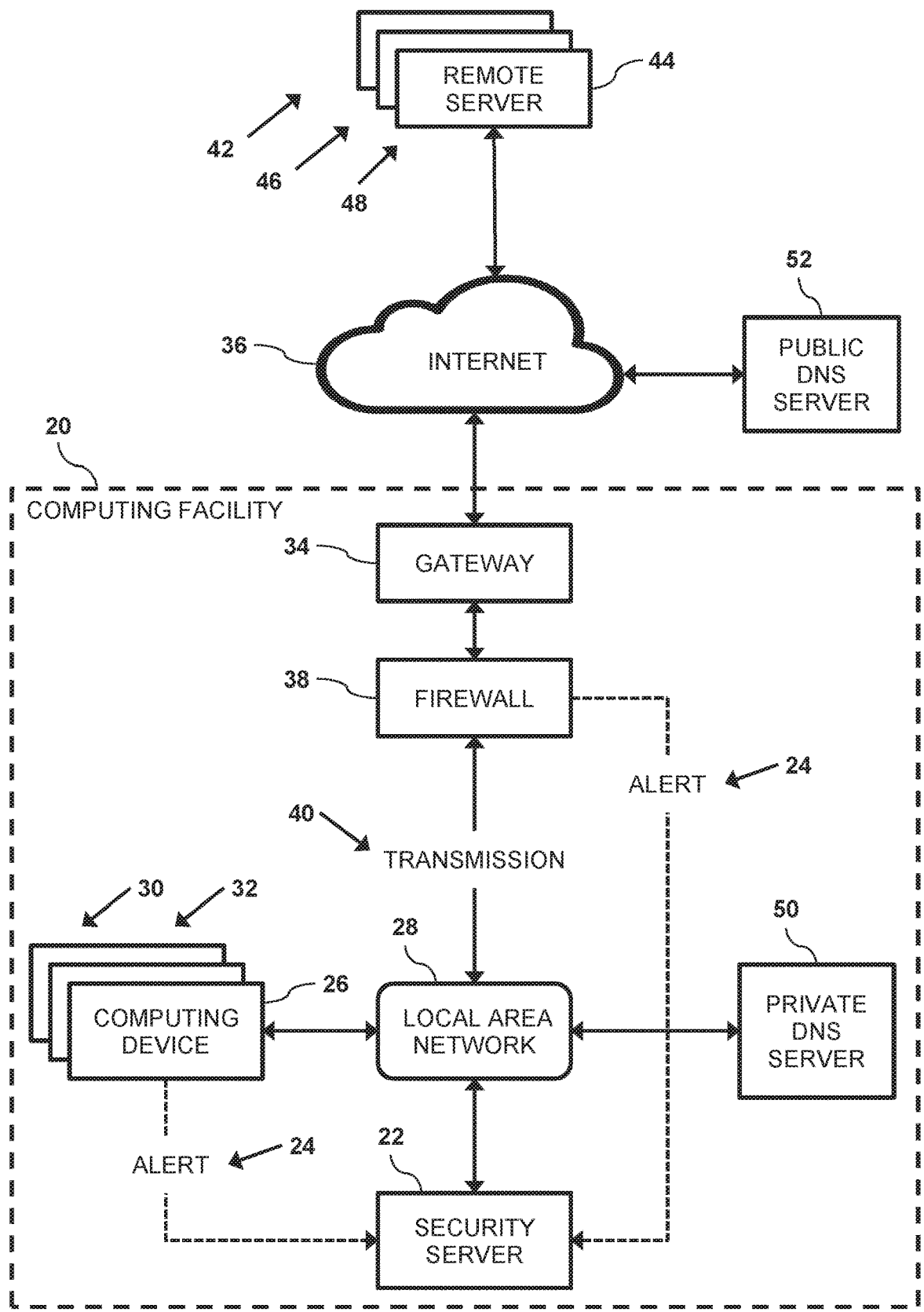
FIG. 1 is a block diagram that schematically shows a computing facility comprising a security server that is configured to classify multiple cyber-alerts into a set of security incidents, in accordance with an embodiment of the present invention.

FIG. 1 is a block diagram that schematically shows an example of a computing facility 20 comprising a security server 22 that is configured to classify cyber-alerts 24 into a set of security incidents, in accordance with an embodiment of the present invention. In the configuration shown in FIG. 1, security server is configured to communicate with a plurality of computing devices 26 over a data network such as a local area network (LAN) 28. An example of security server 22 is described in the description referencing FIG. 3 hereinbelow.

Each computing device 26 comprises an endpoint of LAN 28, and may comprise any type of physical (e.g., a desktop/laptop/tablet computer or a smartphone) or virtual (e.g., a virtual machine or a container) computer that is coupled to LAN 28, and has a local IP address 30 assigned for this purpose. An example of a given computing device is described in the description referencing FIG. 2 hereinbelow.

In embodiments of the present invention each given computing device 26 may also comprise a device identifier (ID) 32. Examples of device IDs 32 include, but are not limited to, a media access control (MAC) addresses and Internet Protocol (IP) addresses that can be used to uniquely identify each computing device 26. While any given time, each given computing device 26 is assigned a unique IP address, the given computing device may be associated with multiple IP addresses over an extended time period. For example, the IP address for a given computing device 26 may change after a reboot of the given computing device.

Computing facility 20 may also comprise an Internet gateway 34, which couples computing facility 20 to a public network 36 such as the Internet. To protect computing devices 26, computing facility 20 may also comprise a firewall 38 that controls, based on predetermined security rules, data traffic such as transmissions 40 between computing devices 26 and Internet sites 42, wherein each given Internet site 42 is hosted by a remote server 44 coupled to Internet 36, and comprises a public IP address 46 and a domain name 48 (also referred to herein simply as domain 48).

Computing facility 20 may also comprise a private Domain Name System (DNS) server 50 that is "behind" firewall 38, and can communicate with computing devices 26 via LAN 28. In the configuration shown in FIG. 1, computing devices can also communicate, via LAN 28 and Internet 36, with a public DNS server 52 that is external to computing facility 20 (i.e., "outside" the firewall).

In some embodiments, a given computing device 26 can access a given Internet site 42 by conveying, in a first transmission 40 to a given DNS server, a DNS request for a given domain name 48 corresponding to the given Internet site. In response to receiving the DNS request, the given DNS server conveys, to the given computing device in a second transmission 40, a DNS resolution comprising a given public IP address 46 corresponding to the given domain. Upon receiving the DNS resolution, the given computing system can convey a transmission to a given remote server 44 that hosts the given Internet site and comprises the given public IP address.

In embodiments of the present invention, each cyber-alert 24 indicates potential malicious activity. In one example, a given cyber-alert 24 conveyed by firewall 38 may be in response to a given transmission 40 from a given computing device 26 to a given Internet site 42 that firewall 38 flagged as malicious. In another example, a given cyber-alert 24 conveyed by a given endpoint agent 72 executing on a given computing device 26 indicates malicious activity on the given computing device. Examples of malicious activity that a given endpoint agent 72 can detect on a given computing device 26 include, but are not limited to:

A given file 66 stored on a given computing device 26 that does not have a valid digital signature or that is not classified by a threat intelligence service as benign.

A given process 70 executing on a given computing device does not have a valid digital signature or that is not classified by a threat intelligence service as benign. An example of a given threat intelligence service is Wildfire™ produced by Palo Alto Networks, Inc. of 3000 Tannery Way, Santa Clara, Calif. 95054 USA.

A given process 70 executing on a given computing device 26 that performs a suspicious operation. An example of a given suspicious operation comprises a given process 70 executing on a given computing device that executes the Windows™ operating system (produced by produced by Microsoft Corporation, One Microsoft Way, Redmond, Wash. 98052, USA), and alters the operating system's registry.

Figure 2:
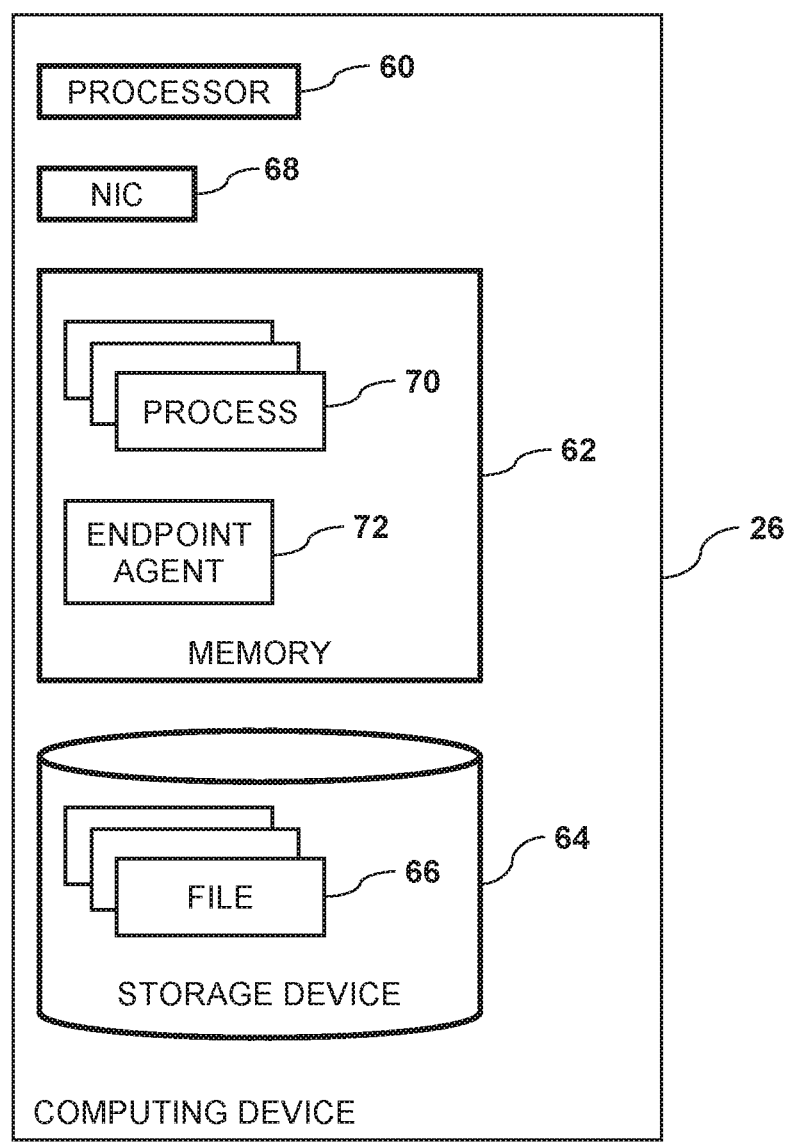
FIG. 2 is a block diagram showing an example of a computing device in communication with the security server, in accordance with an embodiment of the present invention.

FIG. 2 is a block diagram showing an example of hardware and software components of a given computing device 26, in accordance with an embodiment of the present invention. Each given computing device 26 may comprise, for example, a device processor 60, a device memory 62, one or more storage devices 64 configured to store files 66, and a device network interface card 68 that couples the given computing device to LAN 28.

In operation, each processor 60 executes, from its respective memory 62, processes 70 and an endpoint agent 72. Each given process 70 may comprise an instance of a computer program that is being executed by one or many threads on a given processor 60. In embodiments described herein, each given endpoint agent 72 executing on a given processor 60 comprises a software application configured to analyze information on execution and activity of a set of processes 70 executing on the given processor, and to convey the analyzed information to security server 22. An example of endpoint agent 72 is XDR™, also produced by Palo Alto Networks, Inc.

Figure 3:
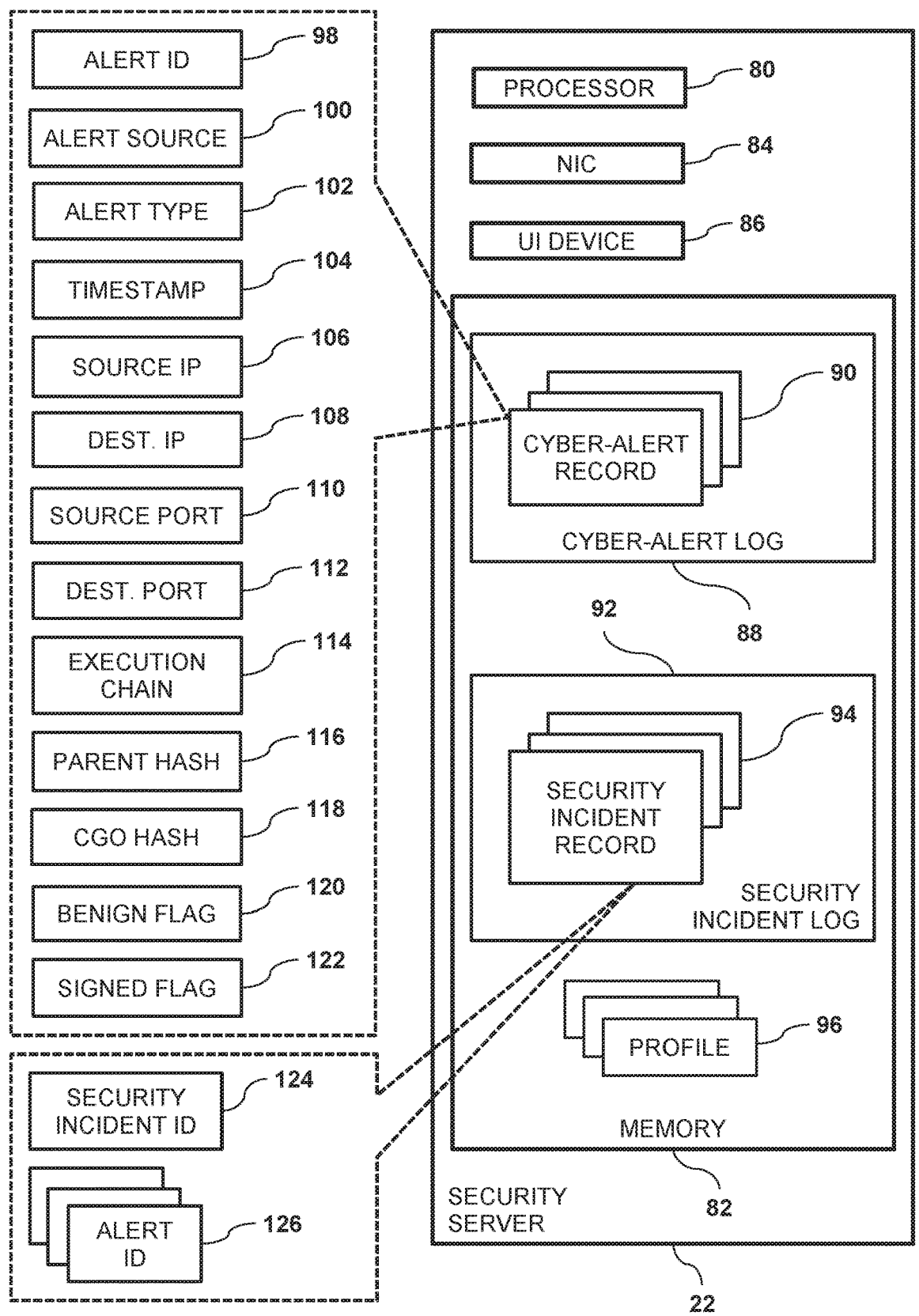
FIG. 3 is a block diagram of the security server, in accordance with an embodiment of the present invention.

FIG. 3 is a block diagram showing an example of hardware and software components of security server 22, in accordance with an embodiment of the present invention. In some embodiments, security server 22 comprises a system processor 80 and a system memory 82, which are coupled by a system bus (not shown) to a network interface controller (NIC) 84 that couples the security to network 28. In some embodiments, security server 22 may comprise a user interface (UI) device 86 (e.g., an LED display) or another type of output interface.

In the configuration shown in FIG. 3, memory 82 stores a cyber-alert log 88 comprising multiple cyber-alert records 90, a security incident log 92 comprising multiple security incident records 94, and a set of profiles 96. Profiles 96 are described in Appendix 1 hereinbelow.

In operation, receives cyber-alerts 24, and for each given cyber-alert 24, processor 80 extracts cyber-artifacts from the given alert, adds a new cyber-alert record 90 to cyber-alert log 88 and populates the added cyber-alert record with the extracted cyber-artifacts. Therefore each cyber-alert 24 has a corresponding cyber-alert record 90.

In some embodiments, as shown in FIG. 1, processor 80 can receive cyber-alerts 24 from sources (also referred to herein as protection alliances) such as firewall 38 and endpoint agents 72. An example of a given cyber-alert 24 that processor 80 can receive from firewall 38 comprises detection of a given transmission 40 from a given computing device to a given Internet site 42 that has been flagged as malicious. An example of a given cyber-alert 24 that processor 80 can receive from a given endpoint agent 72 executing on a given computing device 26 comprises detection, on the given computing device, a given file 66 suspecting of being malicious (e.g., the given file may comprise malware).

In additional embodiments, processor 80 can receive cyber-alerts 24 from other sources such as (a) cybersecurity software (e.g., antivirus) executing on computing devices 26, (b) data cloud firewalls that can detect port scans and malicious activity performed by spyware and viruses, and (c) data cloud security software applications that can monitor containers and cloud-based software applications. In embodiments, of the present invention, any software application or hardware device that can generated and convey cyber-alerts 24 to security server 22 may also be referred to as a protection appliance.

Examples of cyber-artifacts that processor 80 can extract from a given cyber-alert 24 and store to a given cyber-alert record 90 include, but are not limited to:

An alert identifier (ID) 98 for the given alert. Each cyber-alert 24 has a corresponding unique alert ID 98.

An alert source 100 indicating the source (e.g., firewall 38 or a given device ID) of the given alert.

An alert type 102 that indicates specific malicious activity (e.g., a given transmission 40 to a malicious Internet site 42 or a malicious file 66) that caused the given alert.

A timestamp 104 indicating a date and time when the given source generated the given alert.

A source IP address 106 indicating the local IP address of given computing device 26 that caused the alert (e.g., by conveying a given transmission 40 to a malicious Internet site 42 or by storing a malicious file 66).

A destination IP address 108. If the given alert was generated in response to a given transmission 40 from a given computing devices to a given Internet site 42, then destination IP address 108 comprises the public IP address of the given Internet site.

A source port 110. If the given alert was generated in response to a given transmission 40 from a given computing devices to a given Internet site 42, then source port 110 indicates the source port in the given transmission.

A destination port 112. If the given alert was generated in response to a given transmission 40 from a given computing devices to a given Internet site 42, then destination port 112 indicates the destination port in the given transmission.

An execution chain 114. Processors 60 can identify respective execution chains for processes 70. If the given alert was generated in response to malicious activity performed by a given process 70, then execution chain 114 comprises a chain of processes 70 whose endpoint comprises the given process. Execution chains 114 are described in the description referencing FIG. 4 hereinbelow.

A parent hash 116. Processors 60 can compute respective cryptographic parent hashes 116 for processes 70. If the given alert was generated in response to malicious activity performed by a given process 70, then parent hash 116 comprises a cryptographic hash of the given process.

A causality group owner (CGO) hash 118. Processors 60 can compute respective CGO cryptographic hashes 118 for the CGO processes of processes 70. CGO processes, also referred to herein simply as CGOs, are described in the description referencing FIG. 4 hereinbelow. If the given alert was generated in response to malicious activity performed by a given process 70, then CGO hash 118 comprises a crytographic hash of the first process 70 in the execution chain ending with the given process.

A benign flag 120. If the given alert was generated in response to execution of a given process 70 or detection of a given file 66, the benign flag for the given process indicates whether or not the given process/file is classified (e.g., by a threat intelligence service) as benign.

A signed flag 122. If the given alert was generated in response to execution of a given process 70 or detection of a given file 66, the signed flag for the given process indicates whether or not the given process/file comprises a valid digital signature.

In the configuration shown in FIG. 3, each security incident record 94 comprises:

A security incident ID 124. Each security incident has a corresponding unique security incident ID 124.

A set of alert IDs 126, wherein each given alert ID 126 corresponds to a given alert ID 98.

In embodiments of the present invention, processor 80 can classify multiple cyber-alerts 24 into a given security incident by classifying multiple cyber-alert records 90 into a single security incident record 94. Therefore each of the security incidents has a corresponding security incident record. In embodiments described herein, classifying multiple cyber-alerts 24 into a given security incident by classifying multiple cyber-alert records 90 into a single security incident record 94 may also be referred to as correlating the alerts.

In one embodiment, processor 80 can classify multiple cyber-alert records 90 into a single security incident record 94, by identifying multiple cyber alert records 90 that have timestamps 104 within a specified time period (e.g., 12, 24 or 48 hours, and have identical source IPs 106, destination IPs 108, source ports 110 and destination ports 112. Upon identifying the multiple cyber alert records, processor 80 can add a new security incident record 94 to log 92, generate and store a unique security incident ID 124 to the added security incident record, and store, to the alert IDs 126 in the added security incident record, the alert IDs 98 of the identified multiple cyber-alert records 90.

In some embodiments, the tasks of analyzing transmissions 40, files 66 and processes 70 as described herein may be split among multiple devices within computing facility 20 (e.g., one or more additional security servers 22 and/or computing devices 26) or external to the computing facility (e.g., a data cloud based application). In additional embodiments, the functionality of some or all of computing devices 26 and/or security server 22 may be deployed in computing facility 20 and/or Internet 36 as virtual machines and/or containers.

Processors 60 and 80 comprise general-purpose central processing units (CPU) or special-purpose embedded processors, which are programmed in software or firmware to carry out the functions described herein. This software may be downloaded to security server 22 and computing devices 26 in electronic form, over a network, for example. Additionally or alternatively, the software may be stored on tangible, non-transitory computer-readable media, such as optical, magnetic, Or electronic memory media. Further additionally or alternatively, at least some of the functions of processors 60 and 80 may be carried out by hard-wired or programmable digital logic circuits.

Examples of memories 62 and 82 include dynamic random-access memories and non-volatile random-access memories. Examples of storage devices 64 include non-volatile storage devices such as hard disk drives and solid-state disk drives.

Figure 4:
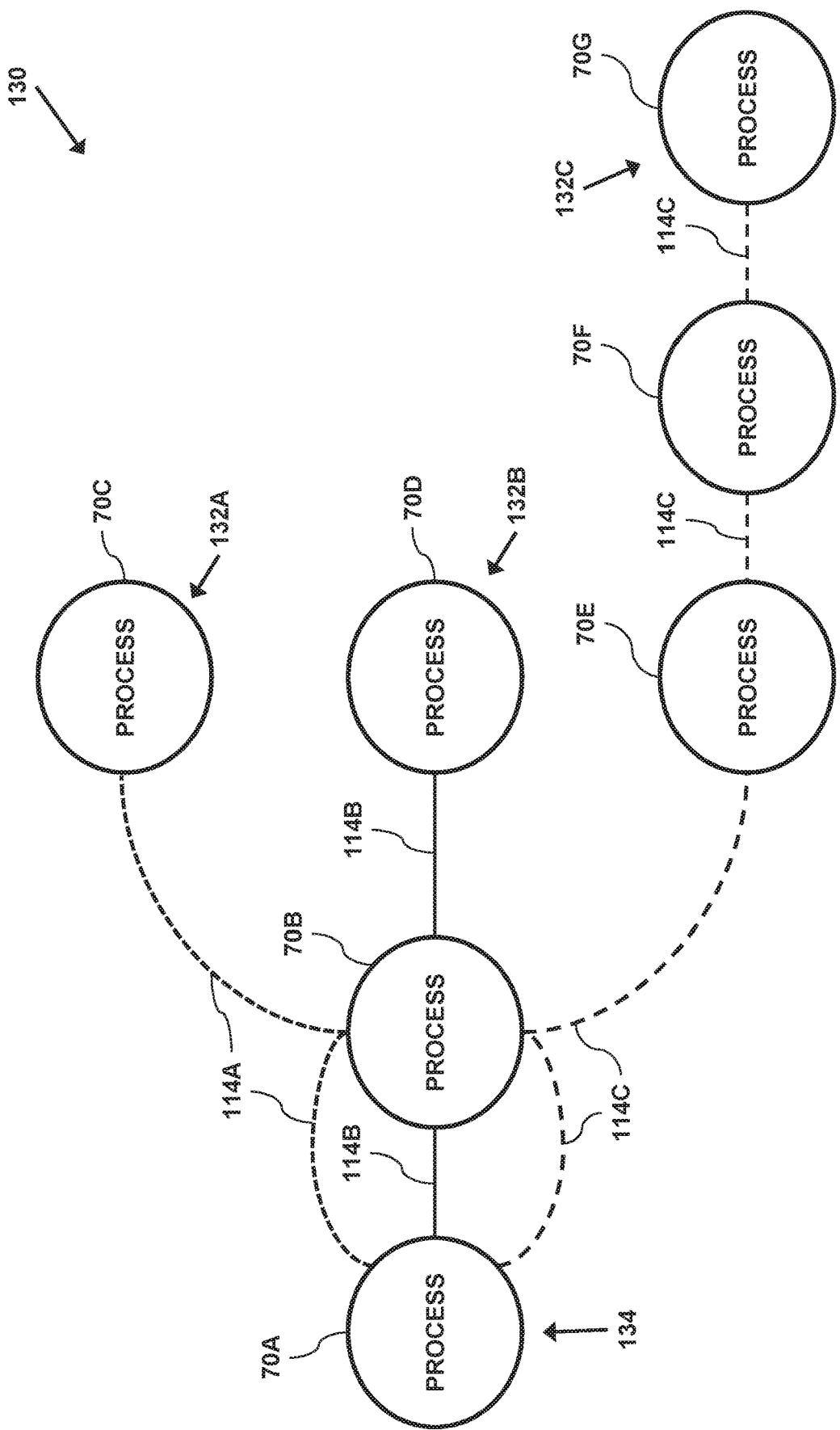
FIG. 4 is a graph showing examples of process execution chains that execute on the computing device, in accordance with an embodiment of the present invention.

FIG. 4 is a graph 130 showing examples of process execution chains 114 that can execute on a given computing device 26, in accordance with an embodiment of the present invention. Process execution chains 114 comprise respective endpoints 132 indicating a given process 70. In some embodiments, a given endpoint 132 indicates a given process 70 whose activity caused a given protection appliance to generate a given cyber-alert 24.

In FIG. 4, processes 70, execution chains (also known as causality chains) 114, and endpoints 132 may be differentiated by appending a letter to the identifying numeral, so that the processes comprise processes 70A-70G, the execution chains comprise remote execution chains 114A-114C, and the endpoints comprise endpoints 132A-132C.

In the example shown in FIG. 4, process 70A comprises a CGO process 134 for execution chains 114A, 114B and 114C. Additionally, in the example shown in FIG. 4:

Execution chain 114A comprises process 70A, 70B and 70C, wherein process 70A calls process 70B, and process 70B calls 70C. Endpoint 132A for execution chain 114A comprises process 70C.

Execution chain 114B comprises process 70A, 70B and 70D, wherein process 70A calls process 70B, and process 70B calls 70D. Endpoint 132B for execution chain 114B comprises process 70D.

Execution chain 114A comprises process 70A, 70B, 70E, 70F and 70G, wherein process 70A calls process 70B, process 70B calls 70E, process 70E calls 70F, and process 70F calls process 70F. Endpoint 132C for execution chain 114C comprises process 70F.

CGO process 134 comprises process 70A for execution chains 114A, 114B and 114C. Therefore, if processes 70D, 70D and 70G generated respective cyber-alerts 24, process 70A is the first process 70 in the causality chains that caused the alerts.

Cyber-Alert Classification

Figure 5:
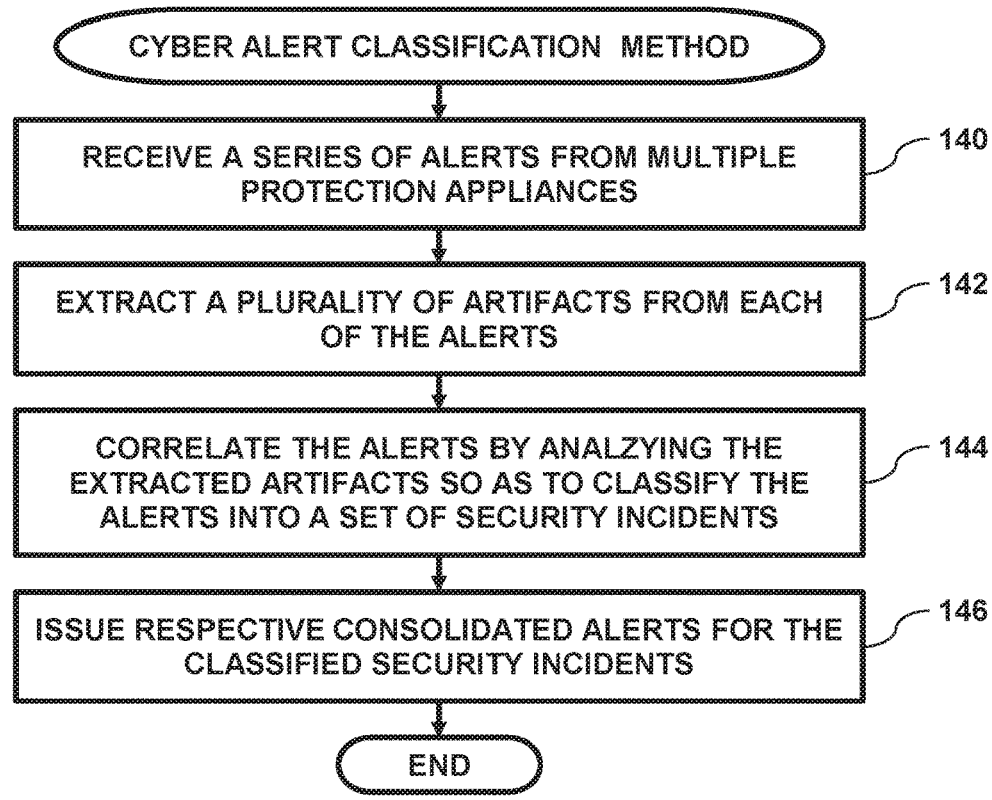
FIG. 5 is a flow diagram that schematically illustrates a method of classifying multiple cyber-alerts into a set of security incidents, in accordance with an embodiment of the present invention.

FIG. 5 is a flow diagram that schematically illustrates a method of classifying multiple cyber-alerts 24 into a set of security incident records 94, in accordance with an embodiment of the present invention.

In step 140, processor 80 receives a series of cyber-alerts 24 from security appliances such as firewall 38 and endpoint agents 72.

In step 142, processor 80 can extract artifacts from each of the received cyber-alerts, and store the extracted artifacts to respective cyber-alert records 90 as described in the description referencing FIG. 3 hereineabove.

In step 144, processor 80 correlates the received cyber-alerts into a set of security incidents, wherein each of the security incidents indicates a single cyber-attack on LAN 28 in computing facility 20. To correlate the received cyber-alerts into a set of security incidents, processor 80 can (as described in the description referencing FIG. 3 hereinabove) generate a given security incident record 144 by identifying multiple cyber alert records 90 that have timestamps 104 within a specified time period, and identical source IPs 106, destination IPs 108, source ports 110 and destination ports 112. In additional embodiments, processor 80 can perform step 144 by applying a given profile 96, as described hereinbelow in Appendix 1.

The cyber-alerts that processor 80 classifies into a single security incident may comprise at least first and second cyber-alerts 24. In some embodiments, the first and the second cyber-alerts (i.e., as indicated by their corresponding cyber-alert records 90) comprise different respective alert sources 100 and different respective alert types 102. For example, processor 80 may receive the first alert from firewall 38 and receive the second alert from a given endpoint agent 72 executing on a given computing device, wherein the first alert identifies a given transmission 40 from the given computing device to a given Internet site 42 that the firewall has identified as suspicious, and wherein the second alert identifies a given file 66 on the given computing device that the given endpoint agent has identified as potentially malicious (e.g., based on the digital signature of the given file).

Continuing this example, processor 80 can classify the first and the second cyber-alerts into a single the second cyber-alert is subsequent to the first cyber-alert, and wherein the first and the second cyber-alerts are within a specified time period (e.g., 12, 24 or 48 hours), as indicated by the timestamps in the cyber-alert records corresponding to a first and the second cyber-alerts.

Finally, in step 146, processor 80 can issue respective consolidated alerts for the classified security incidents, and the method ends. In some embodiments, for each given security incident, processor 80 can identify a one or more computing devices responsible for or impacted by the given security incident and issue a given consolidated alert for the identified computing devices. For example, processor 80 can receive, from firewall 38, cyber-alerts 24 response to the firewall detecting respective transmissions 40 from different computing devices 26 to the same Internet site 42 that the firewall 38 identified as suspicious. Since this activity may indicate a phishing attack on LAN 28, processor can issue a consolidated alert for the computing devices that conveyed the transmissions to the suspicious Internet site.

In one embodiment, processor 80 can issue a given consolidated alert for a given computing device 26 by instructing firewall 38 to block transmissions 40 from the given computing device. In another embodiment, processor 80 can issue a given consolidated alert for a given computing device 26, by presenting, to a system administrator on UI device 86, a notification comprising the given consolidated alert.

Figure 6:
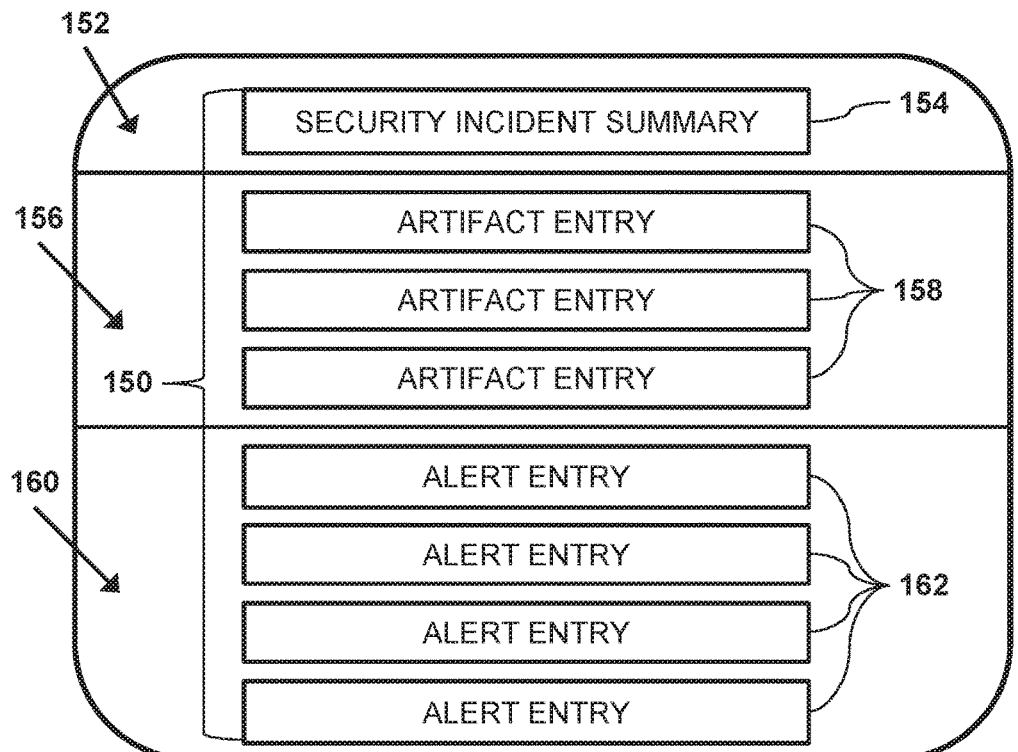
FIG. 6 is a block diagram showing an example a presenting, on a display, a consolidated alert for a given security incident, in accordance with an embodiment of the present invention.

FIG. 6 is a block diagram showing an example a presenting, on UI device 86, a consolidated alert 150 for a given security incident, in accordance with an embodiment of the present invention.

In this example, processor 80 presents:
- A first region 152 comprising a security incident summary 154 that briefly summarizes the given consolidated alert. Security incident summary 154 may comprise information such as an attack type (e.g., phishing) and a number of computing devices 26 that were impacted by the given security incident.
- A second region 156 comprising multiple artifact entries 158. Each given artifact entry 158 may comprise information from a given cyber-alert record 90 that processor classified as part of the given security incident. For example, a given artifact entry 158 can present information from a given cyber-alert record 90 such as the given destination IP address (i.e., for a given transmission 40), the execution chain 114, the given benign flag 120 (i.e., for a given file 66 or a given process 70) and the signed flag 122 (also for a given file 66 or a given process 70). In some events region 156 may be scrollable on UI device 86.
- A third region 160 comprising multiple alert entries 162. Each given alert entry 162 may comprise information from a given cyber-alert record 90 that processor classified as part of the given security incident. For example, a given alert entry 162 can present information from a given cyber-alert record 90 such as the timestamp, the source IP address indicating a given computing device 26, the alert source end the alert type. In some events region 160 may be scrollable on UI device 86.

APPENDIX 1: PROFILES

In some embodiments, processor 80 can identify a given security incident by applying a given profile 96 to cyber-alert records in order to correlate two or more cyber-alerts 24 by classifying the corresponding two or more cyber-attack records 90 into a single security incident record 94 corresponding to the given security incident.

A first example of a given profile 96 can be referred to as a causality ID profile. In some embodiments, processor 80 can apply the causality ID profile by identifying at least two cyber-alert records 90 comprise identical execution chains 114 executing on a given computing device 26, adding a new security incident record 94 to security incident log 92, and populating the alert IDs 126 in the new security incident record with the alert IDs 98 in the identified cyber-alert records.

An example of a given security incident that processor 80 classified via the causality ID profile comprises a given execution chain 114 comprising an email application (i.e., a first given process 70) that called a browser application (i.e., a second given process 70). In this given security incident that processor 80 classified using the causality ID profile:
- The browser conveyed a given transmission 40 to a given Internet site 42, and firewall 38 identified the given Internet site as suspicious, and generated a first cyber-alert 24.
- Within a specified time period (e.g., 24 hours), the browser downloaded a given file that the endpoint agent (i.e., executing on the same computing device 26 as the browser) identified as a suspicious file (e.g., the given file did not have a valid signature), and generated a second cyber-alert 24.

A second example of a given profile 96 can be referred to as a causality profile. In some embodiments, processor 80 can apply the causality profile by identifying at least two cyber-alert records 90 comprise identical CGO hashes 118 (and thereby identifying the CGO process executing on a given computing device 26), adding a new security incident record 94 to security incident log 92, and populating the alert IDs 126 in the new security incident record with the alert IDs 98 in the identified cyber-alert records.

An example of a given security incident that processor 80 classified via the causality profile comprises a browser (i.e., a first process 70 that is the CGO process) that executed on a given computing device 26, downloaded a first executable file 66 (i.e., which the given processor executes as a second given process 70), and downloaded a second executable file 66 (i.e., which the given processor executes as a third given process 70).

In this example, a first given execution chain 114 comprises the first and the second processes, and a second given execution chain comprises the first and the third processes. In this given security incident that processor 80 classified using the causality ID profile:
- The second process conveyed a given transmission 40 to a given Internet site 42, and firewall 38 identified the given Internet site as suspicious, and generated a first cyber-alert 24.
- Within a specified time period (e.g., 24 hours), the third process changed a registry value in an operating system executing on the given computing device, that the endpoint agent executing on the given computing device identified as suspicious activity, and generated a second cyber-alert 24.

A third example of a given profile 96 can be referred to as a network profile. In some embodiments, processor 80 can apply the network profile by identifying, within a specified time period, cyber-alert records 90 that the system processor generated in response to cyber-alerts 24 received from firewall 38 in response to the firewall detecting transmissions 40 from different computing devices 26 to the same Internet site 42 that the firewall identified as suspicious. Processor 80 can apply the network profile so as to classify these cyber-alerts 24 as a single security incident that may indicate a phishing attack on LAN 28.

A fourth example of a given profile 96 can be referred to as a process event profile. In some embodiments, processor 80 can apply the causality profile by identifying at least two cyber-alert records 90 comprise identical parent hashes 116 (and thereby indicating identical processes 70), adding a new security incident record 94 to security incident log 92, and populating the alert IDs 126 in the new security incident record with the alert IDs 98 in the identified cyber-alert records. In some embodiments, the benign flag and/or the signed flag in the identified cyber-alert records are false, thereby indicating the identical processes are suspicious.

In one embodiment, the cyber-alert records corresponding to the identified cyber-alerts may comprise the same alert source 100. In this embodiment, one or more identical processes 70 executing on a given computing device 26 is responsible for the identified cyber-alerts.

In another embodiment, the cyber-alert records corresponding to the identified cyber-alerts may comprise the different alert sources 100. In this embodiment, identical processes 70 executing on a more than one computing device 26 are responsible for the identified cyber-alerts.

An example of a given security incident that processor 80 classified via the causality ID profile comprises one or more identical processes 70 that processor 80 classified using the causality ID profile in response to the following events:

Either the single process or one of the identical processes conveyed a given transmission 40 to a given Internet site 42, and firewall 38 identified the given Internet site as suspicious, and generated a first cyber-alert 24.

Within a specified time period (e.g., 24 hours), ether the single process or one of the identical processes changed a registry value in an operating system executing on the given computing device, that the endpoint agent executing on the given computing device identified as suspicious activity, and generated a second cyber-alert 24.

A fifth example of a given profile 96 can be referred to as a file event profile. In some embodiments, processor 80 can apply the network profile by identifying, within a specified time period, cyber-alert records 90 that the system processor generated in response to cyber-alerts 24 received from different endpoint agents 72 executing on respective computing devices in response to the endpoint agents detecting, on each of the respective computing devices, at least one file 66 that a given endpoint 72 identified as suspicious (e.g., based on the detected file not being benign or signed). Processor 80 can apply the file event profile so as to classify these cyber-alerts 24 as a single security incident.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for protecting a computer network in which multiple computing devices execute respective pluralities of processes, the method comprising:

receiving, in a security server, alerts of multiple different types, indicative of potentially malicious activity in the computer network, that are detected by multiple different protection appliances deployed in the computer network;

identifying respective causality profiles for the processes that gave rise to the alerts received by the security server;

correlating the alerts in the security server using the respective causality profiles so as to identify a first alert of a first type received with respect to a first process from a first protection appliance in the computer network and a second alert of a second type, different from the first type, received with respect to a second process from a second protection appliance in the computer network that are together indicative of a single attack on the computer network; and issuing a consolidated alert responsively to the single attack.

2. The method according to claim 1, wherein receiving the first alert comprises receiving the first alert at a first time, and wherein receiving the second alert comprises receiving the second alert at a second time subsequent to the first time, wherein the first and the second times are within a specified time period.

3. The method according to claim 1, wherein identifying the respective causality profiles comprises identifying respective causality group owners (CGOs) for the processes that gave rise to the alerts, and wherein correlating the alerts comprises detecting that the CGO for the first process matches the CGO for the second process.

4. The method according to claim 1, wherein identifying the respective causality profiles comprises identifying respective execution chains for the processes that gave rise to the alerts, wherein each of the processes that gave rise to the alerts comprises an endpoint for its respective execution chain, and wherein correlating the alerts comprises detecting that the execution chain for the first process matches the execution chain for the second process.

5. The method according to claim 1, wherein identifying the respective causality profiles comprises computing respective parent hashes for the processes that gave rise to the alerts, wherein each given alert comprises a given process and its respective parent hash, and wherein correlating the alerts comprises detecting that the parent hash for the first alert matches the parent hash for the second alert.

6. The method according to claim 1, wherein correlating the alerts comprises detecting that the first alert indicates a first given computing device conveying a first transmission to an Internet site suspected of being malicious, and detecting that the second alert indicates a second given computing device conveying a second transmission to the Internet site.

7. The method according to claim 1, wherein correlating the alerts comprises detecting that the first alert indicates a first given computing device storing a file suspected of being malicious, and detecting that the second alert indicates a second computing device storing an identical copy of the file.

8. The method according to claim 1, wherein each given protection appliance is selected from a group consisting of a firewall, a software application executing on a given computing device, a data cloud firewall and a data cloud security software application.

9. An apparatus for protecting a computer network in which multiple computing devices execute respective pluralities of processes, the apparatus comprising:
- a network interface card (NIC); and
- at least one processor configured:
  - to receive alerts of multiple different types, indicative of potentially malicious activity in the computer network, that are detected by multiple different protection appliances deployed in the computer network,
  - to identify respective causality profiles for the processes that gave rise to the alerts received by the security server,
  - to correlate the alerts in the security server using the respective causality profiles so as to identify a first alert of a first type received with respect to a first process from a first protection appliance in the computer network and a second alert of a second type, different from the first type, received with respect to a second process from a second protection appliance in the computer network that are together indicative of a single attack on the computer network, and
  - to issue a consolidated alert responsively to the single attack.

10. The apparatus according to claim 9, wherein a given processor is configured to receive the first alert by receiving the first alert at a first time, and wherein the given processor is configured to receiving the second alert by receiving the second alert at a second time subsequent to the first time, wherein the first and the second times are within a specified time period.

11. The apparatus according to claim 9, wherein the respective causality profiles comprise respective causality group owners (CGOs) for the processes that gave rise to the alerts, and wherein the at least one processor is configured to correlate the alerts by detecting that the CGO for the first process matches the CGO for the second process.

12. The apparatus according to claim 9, wherein the respective causality profiles comprise respective execution chains for the processes that gave rise to the alerts, wherein each of the processes that gave rise to the alerts comprises an endpoint for its respective execution chain, and wherein the at least one processor is configured to correlate the alerts by detecting that the execution chain for the first process matches the execution chain for the second process.

13. The apparatus according to claim 9, wherein the respective causality profiles comprise respective parent hashes for the processes that gave rise to the alerts, wherein each given alert comprises a given process and its respective parent hash, and wherein the at least one processor is configured to correlate the alerts by detecting that the parent hash for the first alert matches the parent hash for the second alert.

14. The apparatus according to claim 9, wherein a given processor is configured to correlate the alerts by detecting that the first alert indicates a first given computing device conveying a first transmission to an Internet site suspected of being malicious, and by detecting that the second alert indicates a second given computing device conveying a second transmission to the Internet site.

15. The apparatus according to claim 9, wherein a given processor is configured to correlate the alerts by detecting that the first alert indicates a first given computing device storing a file suspected of being malicious, and by detecting that the second alert indicates a second computing device storing an identical copy of the file.

16. The apparatus according to claim 9, wherein each given protection appliance is selected from a group consisting of a firewall, a software application executing on a given computing device, a data cloud firewall and a data cloud security software application.

17. A computer software product for protecting a computer network in which multiple computing devices execute respective pluralities of processes, the product comprising a non-transitory computer-readable medium, in which program instructions are stored, which instructions, when read by a computer, cause the computer:
- to receive alerts of multiple different types, indicative of potentially malicious activity in the computer network, that are detected by multiple different protection appliances deployed in the computer network;
- to identify respective causality profiles for the processes that gave rise to the alerts received by the security server;
- to correlate the alerts in the security server using the respective causality profiles so as to identify a first alert of a first type received with respect to a first process from a first protection appliance in the computer network and a second alert of a second type, different from the first type, received with respect to a second process from a second protection appliance in the computer network that are together indicative of a single attack on the computer network; and
- to issue a consolidated alert responsively to the single attack.

* * * * *